United States Patent [19]

Spears

[11] Patent Number: 5,725,092
[45] Date of Patent: Mar. 10, 1998

[54] PORTABLE STORAGE RACK

[76] Inventor: Gregory Irvin Spears, 4346 Florida St., Perry, Ohio 44081

[21] Appl. No.: 842,911

[22] Filed: Apr. 17, 1997

[51] Int. Cl.$^6$ .................... B65D 85/57; B65D 85/575
[52] U.S. Cl. .................... 206/307.1; 206/815; 312/9.54; 312/9.55
[58] Field of Search .................... 206/307, 307.1, 206/308.1, 309, 387.1, 387.14, 387.15, 806, 813, 815; 220/507, 500, 553, 555; 312/9.1, 9.9, 9.47, 9.53, 9.54, 9.55

[56] References Cited

U.S. PATENT DOCUMENTS

| | | | |
|---|---|---|---|
| 4,901,876 | 2/1990 | Box | 206/308.1 |
| 5,297,675 | 3/1994 | Mastucci | 206/308.1 |

*Primary Examiner*—Jacob K. Ackun

[57] ABSTRACT

A new portable storage rack for releasably holding cases for information media such as compact discs and audio tape cassettes. The inventive device includes a front wall, a rear wall, a pair of side walls, and a sub-floor portion that together define a rectangular storage space. The side walls include a handle cut out on each of their bottom edges. A base floor is positioned below the sub-floor portion and extends between the front wall and the rear wall. A plurality of evenly spaced apart dividing walls for separating and holding the cases of information media are disposed within the storage space. A hook and loop fastener is coupled to the base floor and a support surface to permit removable attachment to the surface and stabilize the portable storage rack on the support surface.

10 Claims, 2 Drawing Sheets

PORTABLE STORAGE RACK

BACKGROUND OF THE INVENTION

1. Field of the Invention

The present invention relates to storage racks and more particularly pertains to a new portable storage rack for releasably holding cases for information media such as compact discs and audio tape cassettes.

2. Description of the Prior Art

The use of storage racks is known in the prior art. More specifically, storage racks heretofore devised and utilized are known to consist basically of familiar, expected and obvious structural configurations, notwithstanding the myriad of designs encompassed by the crowded prior art which have been developed for the fulfillment of countless objectives and requirements.

Known prior art storage racks include U.S. Pat. No. 4,375,850; U.S. Pat. No. 4,257,524; U.S. Pat. No. Des. 358,524; U.S. Pat. No. 5,190,153; U.S. Pat. No. 5,358,124; and U.S. Pat. No. Des. 346,284.

While these devices fulfill their respective, particular objectives and requirements, the aforementioned patents do not disclose a new portable storage rack. The inventive device includes a front wall, a rear wall, a pair of side walls, and a sub-floor portion that together define a rectangular storage space. The side walls include a handle cut out on each of their bottom edges. A base floor is positioned below the sub-floor portion and extends between the front wall and the rear wall. A plurality of evenly spaced apart dividing walls for separating and holding the cases of information media are disposed within the storage space. A hook and loop fastener is coupled to the base floor and a support surface to permit removable attachment to the surface and stabilize the portable storage rack on the support surface.

In these respects, the portable storage rack according to the present invention substantially departs from the conventional concepts and designs of the prior art, and in so doing provides an apparatus primarily developed for the purpose of releasably holding cases for information media such as compact discs and audio tape cassettes.

SUMMARY OF THE INVENTION

In view of the foregoing disadvantages inherent in the known types of storage racks now present in the prior art, the present invention provides a new portable storage rack construction wherein the same can be utilized for releasably holding cases for information media such as compact discs and audio tape cassettes.

The general purpose of the present invention, which will be described subsequently in greater detail, is to provide a new portable storage rack apparatus and method which has many of the advantages of the storage racks mentioned heretofore and many novel features that result in a new portable storage rack which is not anticipated, rendered obvious, suggested, or even implied by any of the prior art storage racks, either alone or in any combination thereof.

To attain this, the present invention generally comprises a front wall, a rear wall, a pair of side walls, and a sub-floor portion that together define a rectangular storage space. The side walls include a handle cut out on each of their bottom edges. A base floor is positioned below the sub-floor portion and extends between the front wall and the rear wall. A plurality of evenly spaced apart dividing walls for separating and holding the cases of information media are disposed within the storage space. A hook and loop fastener is coupled to the base floor and a support surface to permit removable attachment to the surface and stabilize the portable storage rack on the support surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable storage rack apparatus and method which has many of the advantages of the storage racks mentioned heretofore and many novel features that result in a new portable storage rack which is not anticipated, rendered obvious, suggested, or even implied by any of the prior art storage racks, either alone or in any combination thereof.

It is another object of the present invention to provide a new portable storage rack which may be easily and efficiently manufactured and marketed.

It is a further object of the present invention to provide a new portable storage rack which is of a durable and reliable construction.

An even further object of the present invention is to provide a new portable storage rack which is susceptible of a low cost of manufacture with regard to both materials and labor, and which accordingly is then susceptible of low prices of sale to the consuming public, thereby making such portable storage rack economically available to the buying public.

Still yet another object of the present invention is to provide a new portable storage rack which provides in the apparatuses and methods of the prior art some of the advantages thereof, while simultaneously overcoming some of the disadvantages normally associated therewith.

Still another object of the present invention is to provide a new portable storage rack for releasably holding cases for information media such as compact discs and audio tape cassettes.

Yet another object of the present invention is to provide a new portable storage rack which includes a front wall, a rear wall, a pair of side walls, and a sub-floor portion that together define a rectangular storage space. The side walls include a handle cut out on each of their bottom edges. A base floor is positioned below the sub-floor portion and extends between the front wall and the rear wall. A plurality of evenly spaced apart dividing walls for separating and holding the cases of information media are disposed within the storage space. A hook and loop fastener is coupled to the base floor and a support surface to permit removable attachment to the surface and stabilize the portable storage rack on the support surface.

Still yet another object of the present invention is to provide a new portable storage rack that may be removably attached to the interior of a vehicle and holds the compact discs so that they are stable when driving the vehicle.

Even still another object of the present invention is to provide a new portable storage rack that allows users to organize and store their compact discs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
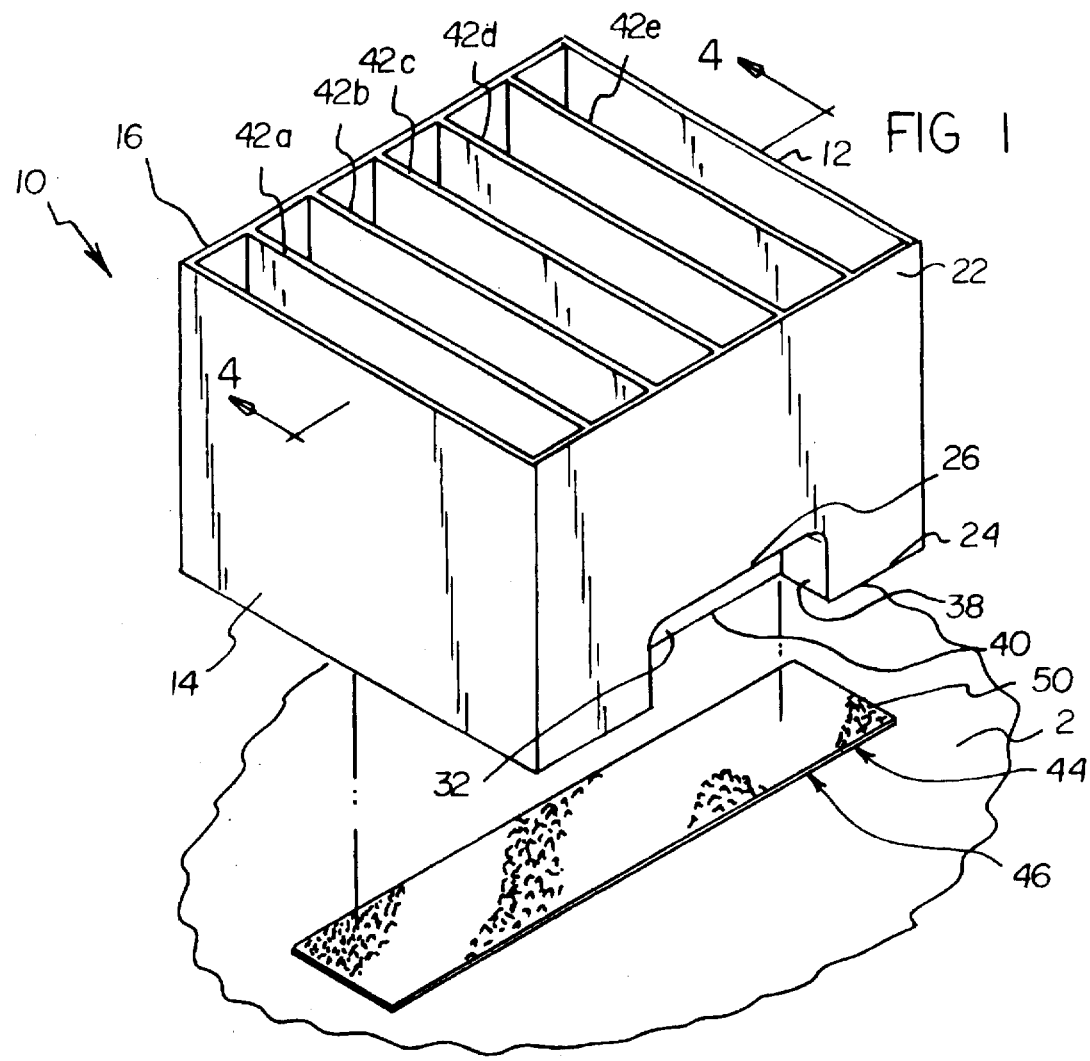
FIG. 1 is a schematic perspective view of a new portable storage rack according to the present invention.
Figure 2:
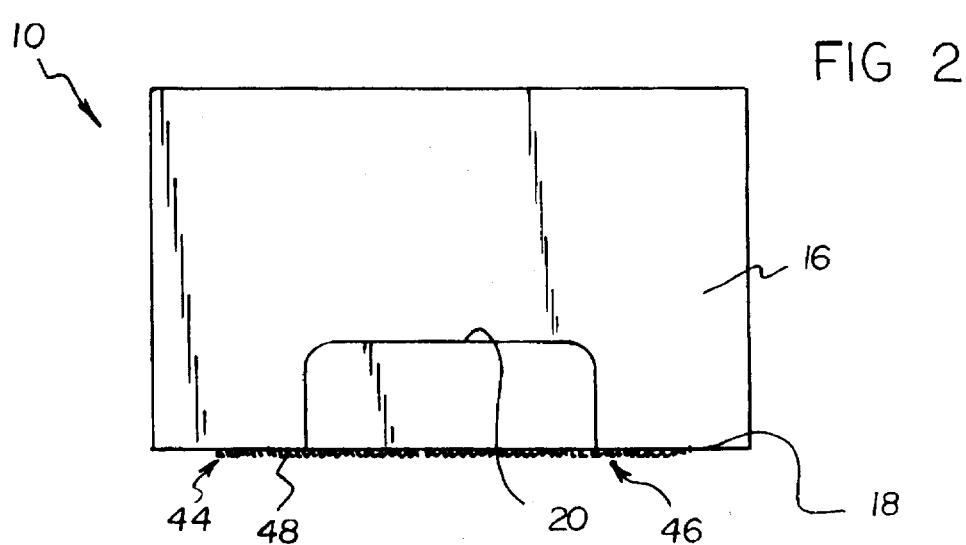
FIG. 2 is a schematic side view of the present invention.
Figure 3:
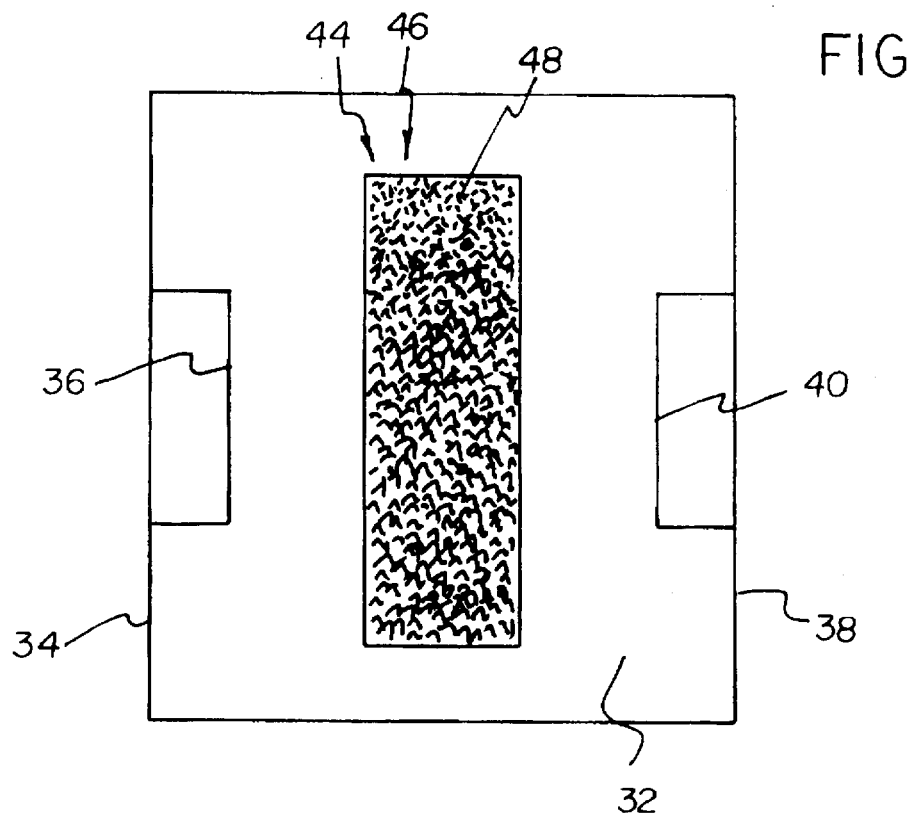
FIG. 3 is a schematic bottom plan view of the present invention.
Figure 4:
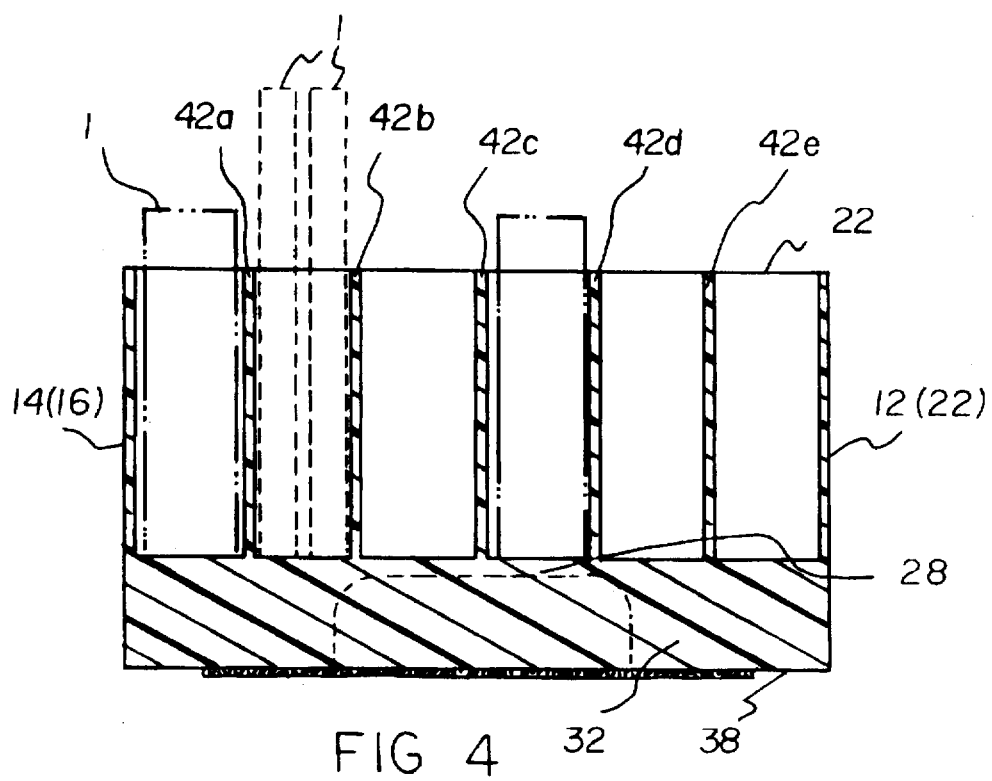
FIG. 4 is a schematic cross-sectional side view taken from line 4—4 of FIG. 1 of the present invention.

With reference now to the drawings, and in particular to FIGS. 1 through 4 thereof, a new portable storage rack embodying the principles and concepts of the present invention and generally designated by the reference numeral 10 will be described.

As best illustrated in FIGS. 1 through 4, the portable storage rack 10 comprises a front wall 12 and a rear wall that are spaced apart and substantially parallel to each other. The portable storage rack 10 also includes a first side wall 16 and a second side wall 22 that are spaced apart and substantially parallel to each other. Both the first and second side walls 16, 22 are extended between the front wall 12 and the rear wall 14. The bottom edges 18, 24 of the side walls 16, 22 have a handle cutout 20, 26 to facilitate carrying of the portable storage rack 10.

The invention also includes a sub-floor portion 28 which is positioned above bottom edges 18, 24 and extended between the front wall 12 and the rear wall 14. Preferably, the sub-floor portion 28 is also extended between the side walls 16, 22.

Together the front wall 12, the rear wall 14, the first side wall 16, the second side wall 22 and the sub-floor portion 28 define a rectangular storage space 30 for storing the cases of information media such as tape cassettes and compact discs.

A base floor 32 is positioned below the sub-floor portion 28 and extends between the front wall 12 and the rear wall 14. Preferably, the base floor is also extended between the side walls 16, 22. The base floor 32 also has a handle cutout 36, 40 at its side edges 34, 38. The first side edge cutout 36 is aligned with the first side wall bottom edge cutout 18. Similarly, the second side edge cutout 40 is aligned with the second side wall bottom edge cutout 26.

A plurality of evenly spaced apart dividing walls 42a–e are disposed within the storage space and extended between the side walls 16, 22. The dividing walls 42a–e are designed for separating and holding cases 1 of information media. Preferably, the dividing walls 42a–e are sufficiently spaced apart to permit the positioning of a case for a tape cassette or a compact disc between adjacent dividing walls. Ideally, the dividing walls 42a–e are sufficiently spaced apart to permit the positioning of two compact discs cases or one cassette tape case between adjacent dividing walls 42a–e. The dividing walls 42a, 42e should also be spaced sufficiently apart from the front wall 12 and rear wall 14 to permit the positioning of at least one compact disc case between the front and rear walls 12, 14 and their respective adjacent dividing wall 42a, 42e. Ideally, the portable storage rack 10 includes five evenly spaced apart dividing walls 42a–e.

The portable storage rack 10 also includes a removable fastening means 44 for removably attaching the base floor 32 to a surface 2 intended for support the portable storage rack 10. Preferably, the removable fastening means 44 is a hook and loop fastener 46 that includes a hook portion 48 that is removably attachable to a loop portion 50. The hook portion 48 is coupled to the base floor 32 while the loop portion 50 is designed so that it may be attached to a supporting surface 2.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable storage rack for holding the cases of information media and being for removable attachment to a surface, said portable storage rack comprising:

a front wall;

a rear wall being substantially parallel to said front wall and being spaced apart from said front wall;

a first side wall having a bottom edge and being extended between said front wall and said rear wall, said bottom edge having a handle cutout;

a second side wall having a bottom edge and being extended between said front wall and said rear wall, said second side wall being substantially parallel to said first side wall and being spaced apart from said first side wall, said bottom edge having a handle cutout;

a sub-floor portion being positioned above said first side wall bottom edge and said second side wall bottom edge, said sub-floor portion being extended between said front wall and said rear wall;

a rectangular storage space being defined by said front wall, said rear wall, said first side wall, said second side wall and said sub-floor portion;

a base floor being positioned below said sub-floor portion and being extended between said front wall and said rear wall;

a plurality of evenly spaced apart dividing walls each being disposed within said storage space and each being extended between said first side wall and said second side wall, said dividing walls being for separating and holding the cases of information media; and a removable fastening means for removably attaching said base floor to a surface.

2. The portable storage rack of claim 1, wherein said removable fastening means is a hook and loop fastener including a hook portion and a loop portion, said hook portion being coupled to said base floor and said loop portion being for attachment to a surface.

3. The portable storage rack of claim 1, wherein said sub-floor portion is extended between said first side wall and said second side wall.

4. The portable storage rack of claim 1, wherein said base floor has a first side edge and a second side edge, said base floor being extended between said first side wall and said second side wall, said first side edge having a handle cutout, said second side edge having a handle cutout, said first side edge cutout being aligned with said first side wall bottom edge cutout, said second side edge cutout being aligned with said second side wall bottom edge cutout.

5. The portable storage rack of claim 1, wherein said dividing walls are sufficiently spaced apart to permit the positioning of two cases for compact discs between adjacent dividing walls.

6. The portable storage rack of claim 5, wherein said dividing walls are sufficiently spaced apart to permit the positioning of two cases for compact discs between said rear wall and an adjacent dividing wall and between said front wall and an adjacent dividing wall.

7. The portable storage rack of claim 1, wherein said dividing walls are sufficiently spaced apart to permit the positioning of a case for a tape cassette between adjacent dividing walls.

8. The portable storage rack of claim 7, wherein said dividing walls are sufficiently spaced apart to permit the positioning of two cases for compact discs between adjacent dividing walls.

9. The portable storage rack of claim 8, wherein said dividing walls are sufficiently spaced apart to permit the positioning of two cases for compact discs between said rear wall and an adjacent dividing wall and between said front wall and an adjacent dividing wall.

10. A portable storage rack for holding the cases of information media and being for removable attachment to a surface, said portable storage rack comprising:

a front wall;

a rear wall being substantially parallel to said front wall and being spaced apart from said front wall;

a first side wall having a bottom edge and being extended between said front wall and said rear wall, said bottom edge having a handle cutout;

a second side wall having a bottom edge and being extended between said front wall and said rear wall, said second side wall being substantially parallel to said first side wall and being spaced apart from said first side wall, said bottom edge having a handle cutout;

a sub-floor portion being positioned above said first side wall bottom edge and said second side wall bottom edge, said sub-floor portion being extended between said front wall and said rear wall and being extended between said first side wall and said second side wall;

a rectangular storage space being defined by said front wall, said rear wall, said first side wall, said second side wall and said sub-floor portion;

a base floor having a first side edge and a second side edge, and being positioned below said sub-floor portion, said base floor being extended between said front wall and said rear wall and being extended between said first side wall and said second side wall, said first side edge having a handle cutout, said second side edge having a handle cutout, said first side edge cutout being aligned with said first side wall bottom edge cutout, said second side edge cutout being aligned with said second side wall bottom edge cutout;

a plurality of evenly spaced apart dividing walls each being disposed within said storage space and each being extended between said first side wall and said second side wall, said dividing walls being for separating and holding the cases of information media; and a hook and loop fastener for removably attaching said base floor to a surface, said hook and loop fastener including a hook portion and a loop portion, said hook portion being coupled to said base floor and said loop portion being for attachment to a surface.

\* \* \* \* \*